US008644111B2

(12) United States Patent
Ray et al.

(10) Patent No.: US 8,644,111 B2
(45) Date of Patent: Feb. 4, 2014

(54) METHOD AND SYSTEM FOR TRANSMISSION OF SEISMIC DATA

(75) Inventors: Clifford H. Ray, Fulshear, TX (US); Glenn D. Fisseler, Houston, TX (US)

(73) Assignee: Fairfield Industries, Inc., Sugar Land, TX (US)

( * ) Notice: Subject to any disclaimer, the term of this patent is extended or adjusted under 35 U.S.C. 154(b) by 0 days.

(21) Appl. No.: 13/569,990

(22) Filed: Aug. 8, 2012

(65) Prior Publication Data

US 2012/0300586 A1 Nov. 29, 2012

Related U.S. Application Data

(60) Continuation of application No. 13/532,426, filed on Jun. 25, 2012, now abandoned, which is a continuation of application No. 13/035,665, filed on Feb. 25, 2011, now Pat. No. 8,296,068, which is a continuation of application No. 11/438,168, filed on May 22, 2006, now Pat. No. 7,983,847, which is a division of application No. 10/719,800, filed on Nov. 21, 2003, now Pat. No. 7,124,028.

(51) Int. Cl.
 *G01V 1/00* (2006.01)
(52) U.S. Cl.
 CPC .. *G01V 1/00* (2013.01); *G01V 1/003* (2013.01)
 USPC .............................................. 367/77; 702/14
(58) Field of Classification Search
 USPC .................. 367/14, 21, 37, 76, 77; 702/14
 See application file for complete search history.

(56) References Cited

U.S. PATENT DOCUMENTS

| 1,706,066 | A | | 3/1929 | Karcher |
| 3,886,494 | A | * | 5/1975 | Kostelnicek et al. ........... 367/77 |
| 4,042,905 | A | | 8/1977 | Fort et al. |
| 4,042,906 | A | | 8/1977 | Ezell |

(Continued)

FOREIGN PATENT DOCUMENTS

| GB | 2 434 718 A | 8/2007 |
| KR | 20020059876 A | 7/2002 |

(Continued)

OTHER PUBLICATIONS

Notice of Allowance dated Apr. 12, 2012 issued in co-pending U.S. Appl. No. 13/035,665.

(Continued)

*Primary Examiner* — Isam Alsomiri
*Assistant Examiner* — James Hulka
(74) *Attorney, Agent, or Firm* — Foley & Lardner LLP

(57) ABSTRACT

The transmission method utilizes multiple seismic acquisition units within an array as intermediate short range radio receivers/transmitters to pass collected seismic data in relay fashion back to a control station. Any one seismic unit in the array is capable of transmitting radio signals to several other seismic units positioned within radio range of the transmitting unit, thus allowing the system to select an optimal transmission path. Utilizing an array of seismic units permits transmission routes back to a control station to be varied as needed. In transmissions from the most remote seismic unit to the control station, each unit within a string receives seismic data from other units and transmits the received seismic data along with the receiving unit's locally stored seismic data. Preferably, as a transmission is passed along a chain, it is bounced between seismic units so as to be relayed by each unit in the array.

30 Claims, 2 Drawing Sheets

(56) References Cited

U.S. PATENT DOCUMENTS

| | | |
|---|---|---|
| 4,072,923 A | 2/1978 | Siems et al. |
| 4,583,206 A | 4/1986 | Rialan et al. |
| 4,663,744 A | 5/1987 | Russell et al. |
| 4,666,338 A | 5/1987 | Schoepf |
| 4,815,044 A | 3/1989 | Deconinck et al. |
| 4,823,326 A | 4/1989 | Ward |
| 4,885,724 A | 12/1989 | Read et al. |
| 4,908,803 A | 3/1990 | Rialan |
| 4,914,636 A | 4/1990 | Garrotta |
| 4,979,152 A | 12/1990 | Rialan et al. |
| 4,992,787 A | 2/1991 | Helm |
| 5,124,956 A | 6/1992 | Rice et al. |
| 5,253,223 A | 10/1993 | Svenning et al. |
| 5,550,787 A | 8/1996 | Rialan et al. |
| 5,623,455 A | 4/1997 | Norris |
| 5,706,250 A | 1/1998 | Rialan et al. |
| 5,724,241 A | 3/1998 | Wood et al. |
| 5,822,273 A | 10/1998 | Bary et al. |
| 5,910,763 A | 6/1999 | Flanagan |
| 6,002,640 A | 12/1999 | Harmon |
| 6,070,129 A | 5/2000 | Grouffal et al. |
| 6,078,283 A | 6/2000 | Bednar |
| 6,169,476 B1 | 1/2001 | Flanagan |
| 6,208,247 B1 | 3/2001 | Agre et al. |
| 6,219,620 B1 | 4/2001 | Park et al. |
| 6,226,601 B1 | 5/2001 | Longaker |
| 6,285,955 B1 | 9/2001 | Goldwasser |
| 6,353,577 B1 | 3/2002 | Orban et al. |
| 6,443,228 B1 | 9/2002 | Aronstam et al. |
| 6,549,834 B2 | 4/2003 | McClellan et al. |
| 6,832,251 B1 | 12/2004 | Gelvin et al. |
| 6,883,638 B1 | 4/2005 | Maxwell et al. |
| 6,999,377 B2 | 2/2006 | Burkholder et al. |
| 7,085,196 B2 | 8/2006 | Nemeth |
| 7,124,028 B2 * | 10/2006 | Ray et al. ............... 702/1 |
| 7,254,093 B2 | 8/2007 | Ray et al. |
| 7,269,095 B2 | 9/2007 | Chamberlain et al. |
| 7,298,671 B2 | 11/2007 | Brinkmann et al. |
| 7,310,287 B2 | 12/2007 | Ray et al. |
| 8,296,068 B2 * | 10/2012 | Ray et al. ............... 702/14 |
| 2003/0128627 A1 | 7/2003 | Iseli et al. |
| 2004/0121786 A1 | 6/2004 | Radcliffe et al. |
| 2004/0252585 A1 | 12/2004 | Smith et al. |
| 2005/0114033 A1 | 5/2005 | Ray et al. |
| 2005/0276162 A1 | 12/2005 | Brinkmann et al. |
| 2006/0291327 A1 | 12/2006 | Barakat |
| 2007/0030345 A1 | 2/2007 | Amling et al. |
| 2008/0062815 A1 | 3/2008 | Iseli |
| 2009/0103394 A1 | 4/2009 | Ronnow |
| 2009/0154289 A1 | 6/2009 | Johansen |
| 2011/0242933 A1 | 10/2011 | Maissant et al. |
| 2012/0275269 A1 | 11/2012 | Ray |

FOREIGN PATENT DOCUMENTS

| | | |
|---|---|---|
| KR | 20020094418 A | 12/2002 |
| RU | 959211 A1 | 9/1982 |
| RU | 2091820 C1 | 9/1997 |
| WO | WO-2005/057237 A2 | 6/2005 |
| WO | WO-2008/033969 | 3/2008 |

OTHER PUBLICATIONS

Office Action dated May 3, 2012 issued in co-pending U.S. Appl. No. 13/296,329.

International Search Report, issued Mar. 24, 2011, based on PCT/US2010/027049 (5 pages).

International Preliminary Report on Patentability, issued Sep. 13, 2011, based on PCT/US2010/027049 (9 pages).

Office Action issued in co-pending U.S. Appl. No. 13/531,187, dated Oct. 22, 2012.

Office Action dated Apr. 1, 2013 issued in connection with U.S. Appl. No. 13/296,329.

Final Office Action for U.S. Appl. No. 10/719,800, dated Nov. 22, 2005.

Final Office Action for U.S. Appl. No. 11/438,168, dated Feb. 5, 2008.

Final Office Action for U.S. Appl. No. 11/438,168, dated Jul. 22, 2010.

International Preliminary Report on Patentability for Application No. PCT/US04/030871 dated May 22, 2006.

International Preliminary Report on Patentability for International Application No. PCT/US2004/027049.

International Search Report for Application No. PCT/US04/30871 dated Aug. 8, 2005.

Non-Final Office Action for U.S. Appl. No. 10/719,800, dated Apr. 15, 2005.

Non-Final Office Action for U.S. Appl. No. 10/719,800, dated Jun. 20, 2005.

Non-Final Office Action for U.S. Appl. No. 11/438,168, dated Apr. 2, 2009.

Non-Final Office Action for U.S. Appl. No. 11/438,168, dated Aug. 15, 2008.

Non-Final Office Action for U.S. Appl. No. 11/438,168, dated Jul. 5, 2007.

Non-Final Office Action for U.S. Appl. No. 11/438,168, dated Nov. 30, 2009.

Non-Final Office Action for U.S. Appl. No. 11/438,168, dated Sep. 22, 2010.

Non-Final Office Action for U.S. Appl. No. 12/381,606, dated Dec. 12, 2011.

Non-Final Office Action for U.S. Appl. No. 13/035,665, dated Oct. 24, 2011.

Non-Final Office Action for U.S. Appl. No. 13/296,329 dated Jul. 19, 2013.

Non-Final Office Action for U.S. Appl. No. 13/531,187, dated Jul. 10, 2013.

US Notice of Allowance on U.S. Appl. No. 13/296,329 DTD Aug. 8, 2013.

* cited by examiner

METHOD AND SYSTEM FOR TRANSMISSION OF SEISMIC DATA

CROSS-REFERENCE TO RELATED APPLICATIONS

This application is a continuation of U.S. patent application Ser. No. 13/532426, filed Jun. 25, 2012, now abandoned, which is a continuation of U.S. patent application Ser. No. 13/035665, filed Feb. 25, 2011, which issued as U.S. Pat. No. 8,296,068 on Oct. 23, 2012, which is a continuation of U.S. patent application Ser. No. 11/438168, filed May 22, 2006, which issued as U.S. Pat. No. 7,983,847 on Jul. 19, 2011, which is a divisional of U.S. patent application Ser. No. 10/719800, filed on Nov. 21, 2003, which issued as U.S. Pat. No. 7,124,028 on Oct. 17, 2006. The entire contents of the foregoing applications are hereby incorporated herein by reference.

BACKGROUND OF THE INVENTION

1. Field of the Invention

The present invention relates to seismic data acquisition, and more particularly to a method and system for transmitting data between multiple remote stations in an array and a data collection station utilizing a linked relay system to communicate therebetween permitting transmission paths to be altered.

2. Description of the Prior Art

Seismic exploration generally utilizes a seismic energy source to generate an acoustic signal that propagates into the earth and is partially reflected by subsurface seismic reflectors (i.e., interfaces between subsurface lithologic or fluid layers characterized by different elastic properties). The reflected signals are detected and recorded by seismic units having receivers or geophones located at or near the surface of the earth, thereby generating a seismic survey of the subsurface. The recorded signals, or seismic energy data, can then be processed to yield information relating to the lithologic subsurface formations, identifying such features, as, for example, lithologic subsurface formation boundaries.

Typically, the seismic units or stations are laid out in an array, wherein the array consists of a line of stations each having at least one geophone attached thereto in order to record data from the seismic cross-section below the array. For data over a larger area and for three-dimensional representations of a formation, multiple lines of stations may be set out side-by-side, such that a grid of receivers is formed. Often, the stations and their geophones are remotely located or spread apart. In land seismic surveys for example, hundreds to thousands of geophones may be deployed in a spatially diverse manner, such as a typical grid configuration where each line of stations extends for 5000 meters with stations spaced every 25 meters and the successive station lines are spaced 200 meters apart.

Various seismic data transmission systems are used to connect remote seismic acquisition units to a control station. Generally, the seismic stations are controlled from a central location that transmits control signals to the stations and collects seismic and other data back from the stations. Alternatively, the seismic stations may transmit data back to an intermediate data collection station such as a concentrator, where the data is recorded and stored until retrieved. Whichever the case, the various stations are most commonly hard wired to one another utilizing data telemetry cable. Other systems use wireless methods for control and data transmission so that the individual stations are not connected to each other. Still other systems temporarily store the data at each station until the data is extracted.

In the case of wired stations, typically several geophones are connected in a parallel-series combination on a single twisted pair of wires to form a single receiver group or channel for a station. During the data collection process, the output from each channel is digitized and recorded by the station for subsequent analysis. In turn, stations are usually connected to cables used to communicate with and transport the collected data to recorders located at either a control station or a concentrator station.

In the case of wireless seismic units, each unit communicates with either a central control station or concentrator via radio transmissions. Transmissions are made either directly between each seismic unit and the control station or directly between each seismic unit and the concentrator. To the extent the transmissions are high power, long-range signals, such as between a seismic acquisition unit and a central control station, the transmissions generally require a license from the local governing authority. Units capable of such transmissions also have higher power requirements and thus require larger battery packages. To the extent the seismic acquisition units transmit to a concentrator station utilizing a low power, short-range signal, the transmitting and receiving units must typically have a line of site therebetween.

Illustrative of the prior art is U.S. Pat. No. 6,070,129 which teaches a method and apparatus for transmitting seismic data to a remote collection station. Specifically, an acquisition unit having a geophone attached thereto communicates with a central station either directly by radio channels, or optionally, by means of an intermediate station. To the extent a large number of acquisition units are utilized, the patent teaches that each a plurality of intermediate stations may also be utilized, wherein each intermediate station directly communicates with a portion of the acquisition units. Intermediate stations may function as data concentrators and may also be utilized to control various tasks executed by their respective groups of acquisition units. Whether data is transmitted directly between an acquisition unit and the central station or directly between an acquisition unit and an intermediate station, the transmitting system accumulates seismic data, distributes the data over successive transmission windows and discontinuously transmits the data during successive transmissions in order to lessen variation in seismic data flow.

Similarly, U.S. Pat. No. 6,219,620 teaches a seismic data acquisition system using wireless telemetry, in which a large number of remote seismic acquisition units are grouped together into a plurality of cells and each acquisition unit within a cell communicates directly with a cell access node, i.e., a concentrator, which in turn communicates with a central control unit. This patent teaches that in order to avoid overlap between transmitting seismic units within adjacent cells, adjacent cells utilize different frequencies for communication between units and their respective cell access nodes. In other words, adjacent cells operate at different frequencies so that a particular acquisition unit is only capable of transmitting to the cell access node assigned to its cell.

One drawback to the aforementioned seismic transmission systems of the prior art is that the failure of any one intermediate transmission station or cell access node will prevent communication with a plurality of seismic acquisition units. Furthermore, to the extent an individual unit is prevented from transmitting back to its respective cell access node due to factors external to the unit, the participation and operation of that unit within the array is lost. For example, a unit may lose radio contact with an access point due to a weak signal, weather conditions, topography, interference from other electrical devices operating in the vicinity of the unit, disturbance of the unit's deployment position or the presence of a physical structure in the line of site between the unit and the access point.

Thus, it would be desirable to provide a communication system for a seismic survey array that has flexibility in transmitting signals and data to and from remote seismic units and a control and/or data collection station. The system should be capable of communication between functional seismic units even if one or more intermediate stations fail to operate properly. In addition, the system should be capable of communication between functional seismic units even if a change in environmental or physical conditions inhibits or prevents a direct transmission between a remote unit and its control station.

SUMMARY OF THE INVENTION

The method according to the invention transmits radio signals between individual seismic acquisition units in an array, such that the transmissions can be passed in a relay chain through the array of seismic units. Multiple seismic acquisition units within the array are capable of passing transmissions to multiple other seismic units. More specifically, any one seismic acquisition unit in the array is capable of transmitting radio signals to several other seismic acquisition units positioned within radio range of the transmitting seismic acquisition unit. A network of radio-linked seismic acquisition units such as this permits seismic data transmission routes back to a control station to be varied as desired or needed. In other words, the transmission path utilized to transmit data from the individual seismic acquisition units in an array back to a control station may be altered. In transmissions up the chain, i.e., from the most remote seismic acquisition unit to the control station, each unit receives seismic data from a seismic unit "down" the chain and transmits the received seismic data up the chain along with receiving unit's locally stored seismic data. Preferably, as a transmission moves up the chain, it is bounced between seismic acquisition units so as to be relayed by each unit in the array. The specific transmission path, i.e., the chain of units, for any given transmission may vary between transmissions depending on overall system requirements. Control signals and the like can be passed back down the chain along the same or a different transmission path.

The transmitted signal strength can be altered to adjust the transmission range for a transmitting seismic unit, such that number of potential receiving seismic acquisition units can be controlled. In one embodiment, each seismic acquisition unit is omni-directional in its transmission and is capable of linking to all units within a 360° range around the transmitting unit. Alternatively, a transmitting seismic unit may utilize a directional antenna such that transmissions are made only to one or more seismic acquisition units in a limited or single direction or more limited range of transmission.

Preferably the individual seismic acquisition units are wireless and require no external cabling for data transmission or unit control. Such units may contain a battery, a short-range radio transmitter/receiver, a local clock, limited local memory, a processor and a geophone package. In one embodiment, each unit may include a short-range radio transmission antenna molded or otherwise integrated into the casing of the unit. In another embodiment, each unit may include external spikes that are used not only to couple the unit to the earth, but also as a conductive conduit through which the unit's batteries can be recharged.

At least one and preferably a plurality of seismic acquisition units in the network are located in the proximity of the control station so that the network can utilize short-range radio frequency to transmit seismic data all the way back to the control station. In another embodiment of the invention, the control station is remotely located from the seismic units and one or more concentrators are located in the proximity of the seismic acquisition units of the network so that the network can utilize short-range radio frequency to transmit seismic data to the concentrators. The concentrators, in-turn, can store the seismic data and/or transmit it back as desired to a control station.

Such a concentrator may include a long range transmitter/receiver for communicating with a control station, a short range transmitter/receiver for communicating with the seismic acquisition unit network, mass memory for long-term storage of the collected seismic data from the network, a power source, a local clock and a processor. In one embodiment, the concentrators may communicate with the control station via telemetry cable, while communicating with the seismic acquisition network via short range transmission.

Within the transmission network, there are multiple transmission paths from the most remote unit to the control station/concentrator. The particular transmission path to be used for any given transmission will be determined based on the strength of the signal between communicating units, the operational status of a unit and path efficiency.

DESCRIPTION OF THE PREFERRED EMBODIMENTS

In the detailed description of the invention, like numerals are employed to designate like parts throughout. Various items of equipment, such as fasteners, fittings, etc., may be omitted to simplify the description. However, those skilled in the art will realize that such conventional equipment can be employed as desired.

Figure 1:
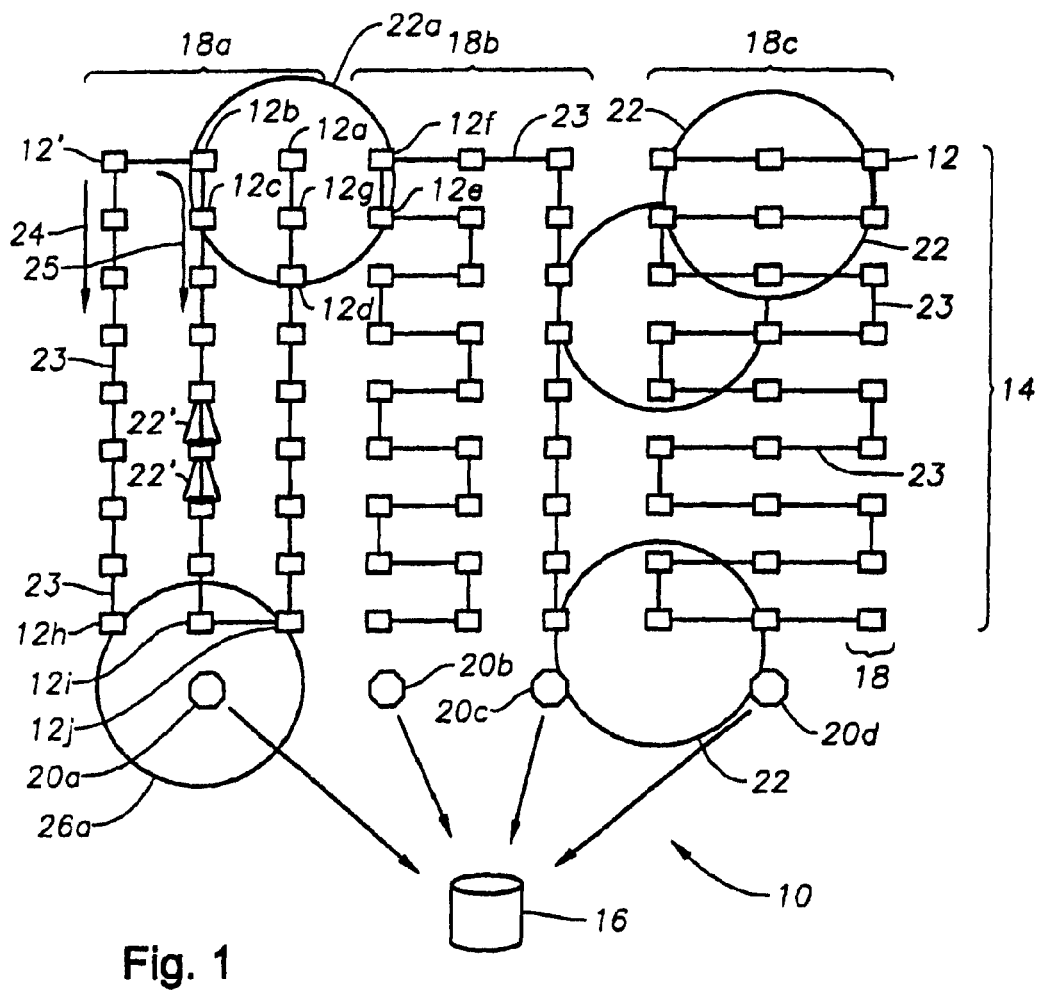
FIG. 1 is a top view of a seismic acquisition array illustrating possible transmission paths between seismic acquisition unit strings in the array.

With reference to FIG. 1, there is shown a seismic data transmission network 10 of the invention. Transmission network 10 is comprised of a plurality of seismic acquisition units 12 spread out in a seismic array 14 and controlled by control station 16. Array 14 is formed of multiple lines 18 of acquisition units 12. Radio transmissions, and in particular, seismic data, are passed from seismic unit 12 to seismic unit 12 as the transmission is bounced through the network 10 to control station 16. In one embodiment of network 10, concentrators 20 are disposed between array 14 and control station 16. While the invention will be described in more detail with references to transmission of seismic data, those skilled in the art will understand that the invention encompasses any type of transmissions from a seismic unit, including, without limitation, quality control data.

Each acquisition unit 12 has an omnidirectional transmission range 22 and can form a wireless link 23 with multiple acquisition units 12. As shown, within the transmission range 22 of a unit 12, there are multiple other units 12 capable of receiving the transmission, in essence forming a local area network comprised of acquisition units 12. For example, unit 12*a* has an omnidirectional transmission range 22*a*. Falling within the transmission range 22*a* of unit 12*a* are seismic acquisition units 12*b*-12*g*. With the flexibility to transmit to multiple acquisition units 12 each having the ability to receive and transmit seismic data to multiple other units 12 within the array 14, each unit 12 within array 14 is presented with multiple paths for communicating seismic data back to control station 16. For example, unit 12' can transmit data back to control station 16 by sending it along path 24, along path 25 or along some other path as determined by the requirements of network 10.

In another embodiment, a transmitting seismic unit 12 may utilize directional radio antenna or antenna array such that transmissions are substantially unidirectional and made only to one or more seismic acquisition units 12 in a limited direction. It is common in the art to utilize phased antenna arrays—an array consisting of two or more antenna's—to achieve transmission directionality and gain improvement. In these types of antenna arrangement, various adjustable antenna parameters, such as phase, can be altered to control directionality and gain, and hence, transmission range. Thus, for purposes of this description, "unidirectional" means a transmission with a higher gain along one axis or in a limited direction, whereas "omni-directional" means a transmission with generally the same gain in substantially 360°. This will maintain the flexibility to transmit to multiple units in the direction the transmitting antenna is pointed, while reducing the number of path options that need to be processed by the overall system, thereby multiple paths to be transmitted on the same frequency at the same time without interfering with one another. In addition, a higher gain in a single or limited direction can be achieved without the need for additional power, or alternatively, power requirements can be decreased, and thus battery life extended, while maintaining the same gain as an omnidirectional signal.

In the illustration of FIG. 1, array 14 is shown as being comprised of three seismic acquisition unit strings 18*a*, 18*b*, and 18*c*. Each string 18*a*, 18*b*, and 18*c* illustrates a different potential transmission path defined by wireless links 23 between the units 12 within a string. Those skilled in the art will understand that the indicated wireless links 23 are for illustrative purposes only and, for purposes of the invention, a "string" 18 of seismic units 12 for a particular transmission path is defined by the selected transmission path by which data is communicated from one unit 12 to another. Thus, for any given array 14, a "string" of units may be constantly changing between transmissions. Such an arrangement permits transmissions to be re-routed in the event of some failure of a unit 12 within the string. Likewise, transmissions can be re-routed in the event of a weak signal between units 12 or to overcome topographic or other obstacles that could interfere with short range, line of site transmissions. Furthermore, in addition some failure of a unit, it may be desirable to reroute a transmission simply because of the operational status of a unit. For example, a unit with lower battery power may be utilized downstream at the end of a string and avoided as a transmission relay further upstream in order to conserve the unit's batteries, i.e., upstream relay units require more power to relay the transmission because of the cumulative size of the transmissions.

In the event multiple adjacent strings are desired, radio transmission parameter assignments may be made to minimize interference with other transmissions and permit reuse of the same transmission parameters. For example, string 18*a* may transmit data at a first set of radio transmission parameters while string 18*b* may transmit data at a second set of parameters. Since the transmissions from a sting 18 are short range, it may only be necessary for adjacent strings to utilize different transmission parameters. In this regard, the physical seismic unit layout of a portion of array 14 defined as a string 18 may be dependent on the short range transmission capabilities of the seismic units 12 in the adjacent string. Non-adjacent strings utilizing the same string are sufficiently spaced apart so as not to interfered with one another. In other words, string 18*b* is defined such that its width is sufficient to ensure that any transmission from a seismic unit 12 from string 18*a* transmitting with a certain set of radio transmission parameters will not be received by any seismic unit 12 from string 18*c* set to receive transmissions using the same set of radio transmission parameters. Those skilled in the art will understand that there are many transmission parameters that can be adjusted in this regard, including the non limiting examples of frequencies, time slots, power, methods of modulation, directional antenna gain, physical spacing of units and strings, etc. Of course, interference between adjacent strings, as well as individual units, may also be minimized by making transmissions in discreet data packages sent in short transmission bursts.

Furthermore, while three strings 18 are depicted to indicate possible transmission paths, system 10 can comprise any number of strings. The number of strings for any given group of transmissions is dependent on the system requirements. For example, rather than multiple strings, each acquisition unit 12 in an array 14 may be utilized in a single transmission path such that the entire array 14 might be considered a "sting" for purposes of the description. Those skilled in the art will understand that the number of transmission paths and the number of acquisition units utilized for any given transmission may constantly be in flux to maximize the operation requirements for a particular transmission or group of transmissions.

In each case, the transmitted signal strength of a seismic unit 12 can be altered to adjust the transmission range for a transmitting seismic unit such that number of potential receiving seismic acquisition units 12 can be controlled.

At least one and preferably a plurality of seismic acquisition units 12 in network 10 are proximately located to control station 16 so that network 10 can utilize short-range radio frequency to transmit seismic data to control station 16 from the seismic units 12. However, large amounts of data transmitted to a control station may be difficult to manage and typically requires high power, long range transmitters. Thus, in one embodiment of the invention, data is accumulated and stored at multiple, dispersed concentrators 20 remote from control station 16. By accumulating seismic data at concentrators 20, the need for radio licenses and other requirements associated with long range transmissions may be avoided. Concentrators 20 are located in the proximity of the seismic acquisition units 12 of the network 10 so that the network 10 can utilize low power, short-range radio transmission to transmit seismic data to the concentrators 20. The concentrators 20, in-turn, can store the seismic data or transmit it back as desired to control station 16. In one embodiment, concentrators locally store seismic data but transmit quality control data received from the acquisition units back to control station 16.

Much like the individual acquisition units 12, each concentrator 20 preferably also has a transmission range 26 that encompasses several seismic acquisition units 12. As within the array 14, transmission of data from a string 18 to the accumulator 20 may be made from a plurality of units 12. For example, accumulator 20*a* has an omnidirectional transmission range 26*a*. Falling within the transmission range 26*a* of accumulator 20a are seismic acquisition units 12h-12j. As such, any of acquisition units 12h-12j may transmit seismic data from string 18a to accumulator 20a. Thus, a failure of one of the acquisition units, such as 12h, would not prevent seismic data from string 18a from being passed up the line. Rather, the transmission path from string 18a to concentrator 20a would simply be rerouted through an operative acquisition unit, such as units 12i or 12j. Concentrators 20 may also be positioned so as to be within the short range transmission distance of adjacent concentrators.

As described above, network 10 can function as either a one-way network, i.e., concentrators 20 are utilized only to receive seismic data transmitted from array 14, or a two-way network, i.e., concentrators 20 transmit command signals out to array 14 in addition to receiving seismic data transmitted from array 14.

In another configuration, seismic data is transmitted back from array 14 utilizing the network of linked seismic acquisition units 12, but control signals are transmitted directly to each acquisition unit 12 from either the control station 16 or an associated concentrator 20. In such case, an acquisition unit 12 may be capable of receiving long range transmissions directly from a distant source with sufficient transmission power for such communications, i.e., control station 16, an associated concentrator 20 or radio repeater stations utilized to extend range, even though the acquisition unit 12 itself is only capable of short range hopped transmissions for sending seismic data back to the control station or concentrator.

Transmissions to control station 16 from accumulators 20 or acquisition units 12 may also include global positioning system ("GPS") or other survey information to establish the location of a particular unit 12 for purposes of the shot and for purposes of retrieval. This is particularly desirable for wireless units as described herein since it may be difficult to locate such units upon retrieval. GPS survey information may also be useful in selection of a transmission path within an array as described above.

In operation, a preferred transmission path may be preset in units 12 or predetermined. Likewise, alternate transmission paths may be preset in units 12 or predetermined. These preset paths, as well as the number of paths required for a particular array 14, are determined based on the volume of the data to be transmitted, the data transmission rates, signal strength and the number of "real time" radio channels having different transmission parameters such that the radio transmission channels are non-interfering, battery power, location of the unit, etc.

Prior to a transmission or a set of transmissions along a string, a beacon signal may be utilized to verify the preferred transmission path in much the same way as an ad hoc network or peer to peer network identifies systems within the network. Alternatively, rather than transmitting data utilizing a preset or predetermined path, the beacon signal may be used to establish a transmission path utilizing the above described parameters. If a beacon signal is transmitted and the preferred transmission path is not available, system 10 will search for another transmission path through the seismic units. In one embodiment, the beacon signal is transmitted and the local units within range send a return signal acknowledging their receipt of the beacon signal. Once a path is verified or established, as the case may be, the path may be "locked in" for purposes of the particular transmission so that system 10 will not continue searching for another path. The beacon signal may be generated from within the array 14 by the seismic units themselves or initiated by the control station or concentrator.

A synchronization signal may also be used to synchronize the recording time for the units of system 10 by establishing a future time t(0) at which trace recording by seismic units 12 is to begin. In contrast, the prior art typically sends out a pulse signal that immediately triggers recording by each seismic unit at the time it receives the signal such that prior art seismic units located closer to the signal source begin recording earlier than seismic units more remote from the signal source. In a preferred embodiment of the invention, all seismic units 12 may be set to start recording at a specific clock time, such that data transmitted back through network 10 is time stamped based on the synchronization shot time. In this regard, all data is time synchronized regardless of the transmission path utilized by the network or the period of time the network takes to transmit the data through the network.

In this same vein, it is also desirable to ascertain the data delay along the path based on master clock time so that data that is not time stamped can be synchronized with the data from other seismic units. The described network 10 permits data to be retrieved via radio transmission in real time or near real time.

Figure 2:
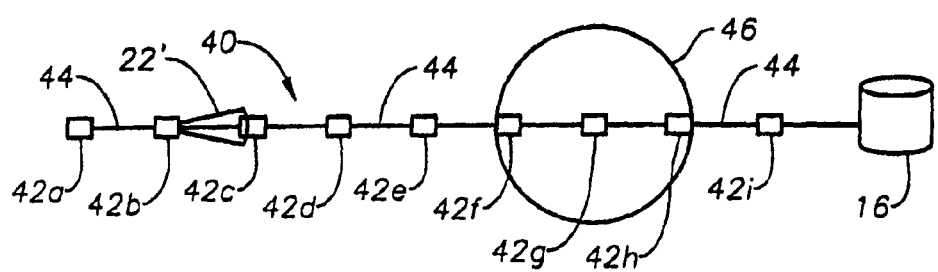
FIG. 2 is a top view of a seismic data transmission path utilizing seismic acquisition units.

While the invention has been described in its broadest sense as possessing the flexibility to alter data transmission paths, i.e., each unit has wireless links with multiple other units, in order to convey acquired seismic data from an array of acquisition units back to a control station or concentrator, it is also true that none of the prior art transmission systems utilize seismic data acquisition units as intermediate transmission devices. Thus, one aspect of the invention as illustrated in FIG. 2 is the use of seismic data acquisition units 12 themselves, configured in a predetermined string, as intermediate devices for passing transmissions from a seismic unit in the string to a control station. In this regard, a string 40 of seismic units 42 is predetermined and defined by an outermost unit 42a and a plurality of intermediate units 42b through 42i. Each unit 42 in string 40 has a wireless link 44 within its transmission range 46 only with the units directly up and directly down the string. For example, seismic unit 42g is only capable of communication with seismic units 42f and 42h via their respective wireless links 44 because only units 42f and 42h are within the transmission range 46 of unit 42g. Upon acquisition of data, unit 42g will transmit the acquired data up the string to 42h, along with any data received by wireless transmission from 42f. All seismic data from the units 12 comprising string 40 will be conveyed up the string to control station 16. Control station 16 can likewise utilize the seismic units 12 to pass control and command signals back down the string.

As mentioned above, one benefit of the invention is the ability to utilize flexible transmission paths that can be readily changed based on various internal and external parameters effecting the network. This flexibility also renders the network itself much more reliable. Preferably, transmission paths can be established and/or rerouted on-the-fly based on these parameters. Another advantage of the system is that it utilizes less power in transmitting a signal over a given distance via multiple short transmissions than would be required of a single transmission over the same distance. In other words, because the power required to transmit a signal decreases as one over the square of the transmission distance, it is much more optimal to transmit a signal in several short hops than it would be to transmit the same signal over the same distance in a single hop. This is true even of low power, short range transmissions. Of course an additional advantage of the system of the invention is that it avoids the need to acquire long range radio transmission licenses. Finally, unlike the prior art, the system of the invention eliminates the need to physically locate a concentrator or similar device in the middle of a seismic array, nor utilize the concentrator to sort and organize multiple seismic data transmissions incoming directly from individual seismic acquisition units.

Figure 3:
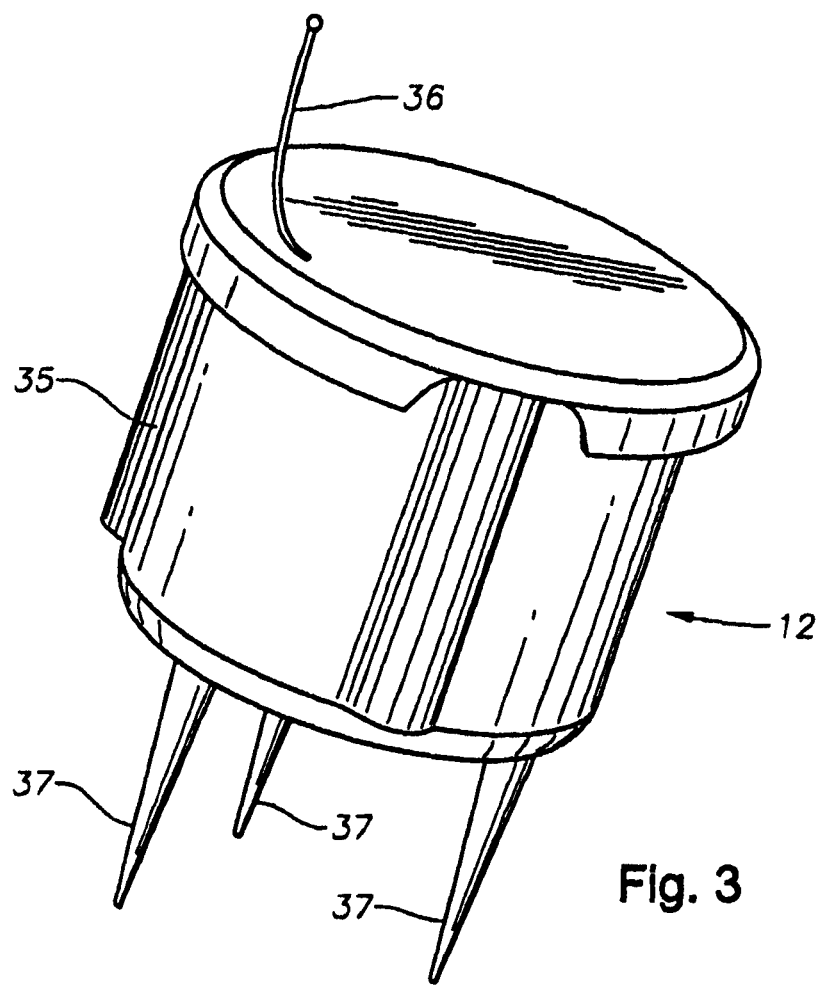
FIG. 3 is an elevation view of a seismic acquisition unit of the invention.
Figure 4:
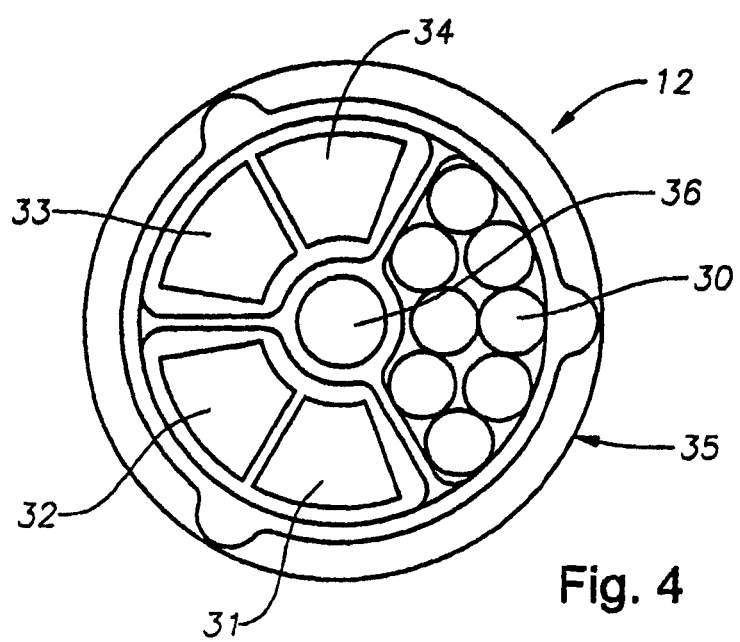
FIG. 4 is a cut-away top view of the unit of FIG. 2.

Turning to the individual seismic acquisition units as illustrated in FIGS. 3 and 4, each unit 12 is preferably wireless and requires no external cabling for data transmission or unit control. Each unit 12 may contain a battery 30, a short-range radio transmitter/receiver 31, a local clock 32, limited local memory 33, and a processor 34 housed within a casing 35. A geophone package 36 may be housed within the casing 35 or externally attached thereto. Any standard short range radio transmission equipment may be utilized. One non-limiting example being wireless fidelity ("Wi-Fi") equipment, where transmission parameters may be selected to provide signal carrier modulation schemes such as complementary code keying (CCK)/packet binary convolution (PBCC) or direct sequence spread-spectrum (DSSS) or multi-carrier schemes such as orthogonal frequency division multiplexing (OFDM) and code division multiple access (CDMA). Local memory capacity is preferably limited since local seismic data is only retained for a short period of time. Further, because the unit 12 need only transmit a short range signal, power requirements for the unit are minimized in contrast to the increased power requirements necessary to transmit a stronger signal to a more distant receiving device. By reducing the memory requirements, the transmission requirements and the battery requirements, the overall cost, as well as the physical size and weight, of each unit is minimized.

While each unit may include an antenna, attached via an external connector, in one embodiment of the invention, each unit 12 may include a short-range radio transmission antenna 36 molded or otherwise integrated into the casing 35 of the unit. This eliminates the need for an external connector. Each unit 12 may also include radio frequency identification or similar identification indicia, such as a bar code. Finally, each unit 12 may include a receiver for receiving long range radio transmissions directly from a control station or concentrator as described above.

In another embodiment, each unit 12 may include external projections or spikes 37 that are used not only to couple the unit to the earth, but also as an electrically conductive conduit through which the unit's internal batteries 30 can be recharged. Such a configuration minimizes the need for external connectors which are known in the industry as a source of various problems such as corrosion, leakage, etc. or alternatively, the need to otherwise open the sealed unit. While any shape, length or number of projections or spikes may be utilized, one preferred configuration utilizes three spikes that can also be utilized to couple the unit to the earth. In a three spike configuration, two of the spikes are connected to the battery through a relay or similar mechanism. The third spike would be used to control the relay. During charging, the relay would be closed; after charging, the relay would be open to prevent battery discharge.

Concentrator 20 (not shown) may include a long range radio transmitter/receiver for communicating with a control station 16, a short range radio transmitter/receiver for communicating with the network of seismic acquisition units 12, a power source, a local clock and a processor. In one embodiment, concentrator 20 functions simply as an intermediate long range receiver/transmitter to relay short range transmissions from the network of seismic units 12 to the control station 16. In another embodiment, concentrator 20 is provided with mass memory for storage of seismic data transmitted from the network of seismic units 12. In either embodiment, concentrator 20 may relay control signals and other transmission from the control station 16 back to the network of seismic units 12. In this same vein, concentrator 20 may be disposed to function as a local control station for a network of seismic units 12. While the preferred embodiment utilizes radio frequency for transmissions between concentrator 20 and control station 16, transmissions therebetween may also occur through various other transmission vehicles, such as telemetry cable or optic cable.

While certain features and embodiments of the invention have been described in detail herein, it will be readily understood that the invention encompasses all modifications and enhancements within the scope and spirit of the following claims.

What is claimed is:

1. A method of seismic data acquisition comprising:
   providing a plurality of seismic data acquisition units, each unit comprising a transceiver configured to wirelessly communicate seismic data with one or more of the other seismic data acquisition units in the plurality of seismic data acquisition units;
   providing a one or more concentrator units each comprising a receiver configured to wirelessly receive seismic data from at least one of the seismic data acquisition units; and
   wirelessly communicating acquired data from the acquisition units to the concentrator units;
      wherein the step of wirelessly communicating acquired data from the acquisition units to the concentrator unit comprises using a string of the seismic data acquisitions units to wirelessly communicate acquired seismic data; and
      wherein, during the step of wirelessly communicating acquired data from the acquisition units to the concentrator units, a first pair of acquisition units communicate with each other at the same time that a second pair of acquisition units communicate with each other; and
   further comprising:
      assigning first and second transmission parameters to the first and second pairs of acquisition units to substantially prevent communication interference between the first and second pairs.

2. The method of claim 1, wherein, during the step of wirelessly communicating acquired data from the acquisition units to the concentrator unit, each of the seismic data acquisition units in the string receives data from at most one upstream unit at a time.

3. The method of claim 1, wherein the first and second transmission parameters are different from each other.

4. The method of claim 3, wherein the first and second transmission parameters each comprise a transmission frequency.

5. The method of claim 3, wherein the first and second transmission parameters each comprise a multiplexing signature.

6. The method of claim 5, wherein the multiplexing signature comprises information related to the transmission modulation method used by the pair of acquisition units.

7. The method of claim 6, wherein the modulation method comprises a multi-carrier modulation scheme.

8. The method of claim 7, wherein the multi-carrier modulation scheme comprises a frequency division multiplexing scheme or a code division multiplexing scheme.

9. The method of claim 6, wherein the modulation method comprises a time division multiplexing scheme.

10. The method of claim 5, further comprising adjusting the multiplexing signature.

11. The method of claim 1, wherein the concentrator unit comprises a transmitter having a transmission range longer than the transmission range of each of the plurality of seismic data acquisition units; and further comprising transmitting collected data using the concentrator unit.

12. The method of claim 1, wherein for each unit, the transceiver is configured to wirelessly communicate seismic data with one or more of the other seismic data acquisition units using a short range radio transmission.

13. The method of claim 1, wherein the string of units comprises at least three units.

14. The method of claim 1, wherein the string of units comprises at least four units.

15. The method of claim 1, wherein the acquired data comprises quality control data for at least one of the units.

16. A system for seismic data acquisition comprising:

a plurality of seismic data acquisition units, each unit comprising a transceiver configured to wirelessly communicate seismic data with one or more of the other seismic data acquisition units in the plurality of seismic data acquisition units;

one or more concentrator units each comprising a receiver configured to wirelessly receive seismic data from at least one of the seismic data acquisition units; and wirelessly communicating acquired data from the acquisition units to the concentrator units;

wherein the step of wirelessly communicating acquired data from the acquisition units to the concentrator unit comprises using a string of the seismic data acquisitions units to wirelessly communicate acquired seismic data;

wherein, during the step of wirelessly communicating acquired data from the acquisition units to the concentrator units, a first pair of acquisition units communicate with each other at the same time that a second pair of acquisition units communicate with each other; and wherein, during operation, the plurality of seismic data acquisition units comprises a string of the seismic data acquisitions units to wirelessly communicate acquired seismic from the acquisition units to the concentrator;

wherein, during operation, a first pair of acquisition units are configured to communicate with each other at the same time that a second pair of acquisition units communicates with each other, wherein the first and second pairs or acquisition units are assigned first and second transmission parameters, respectively, to substantially prevent communication interference between the first and second pairs.

17. The system of claim 16, wherein, each of the seismic data acquisition units in the string are configured to receive seismic data from at most one upstream unit at time.

18. The system of claim 16, wherein, each of the seismic data acquisition units in the string are configured to receive seismic data from no downstream units.

19. The system of claim 16, wherein the first and second transmission parameters are different from each other.

20. The system of claim 19, wherein the transmission parameters comprise transmission frequencies.

21. The system of claim 16, wherein the transmission parameters comprise multiplexing signatures.

22. The system of claim 21, wherein the multiplexing signatures comprises information related to the transmission modulation method used by the pair of acquisition units.

23. The system of claim 22, wherein the modulation method comprises a multi-carrier modulation scheme.

24. The system of claim 23, wherein the multi-carrier modulation scheme comprises a frequency division multiplexing scheme or a code division multiplexing scheme.

25. The system of claim 22, wherein the modulation method comprises a time division multiplexing scheme.

26. The system of claim 25, wherein the concentrator unit comprises a transmitter having a transmission range longer than the transmission range of each of the plurality of seismic data acquisition units.

27. The system of claim 26, wherein for each unit, the transceiver is configured to wirelessly communicate seismic data with one or more of the other seismic data acquisition units using a short range radio link.

28. The system of claim 16, wherein the string of units comprises at least three units.

29. The system of claim 16, wherein the acquired data comprises quality control data for at least one of the units.

30. The sensor of claim 16, wherein at least one of the seismic data acquisition units comprises a geophone.

* * * * *